(No Model.)
J. BURKE.
CUTTING APPARATUS FOR GRAIN CUTTING OR MOWING MACHINES.
No. 324,651. Patented Aug. 18, 1885.
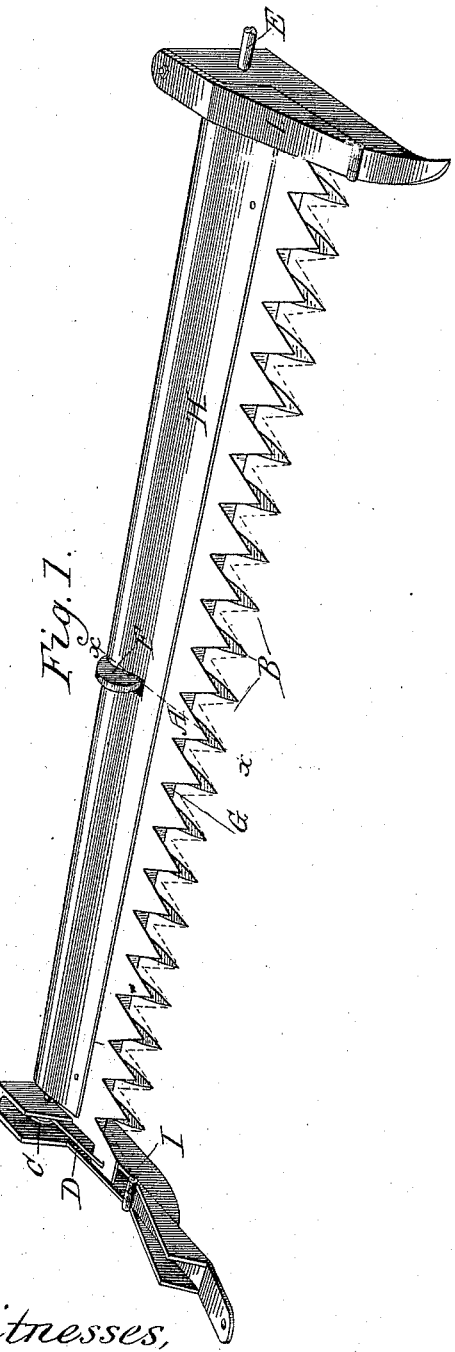
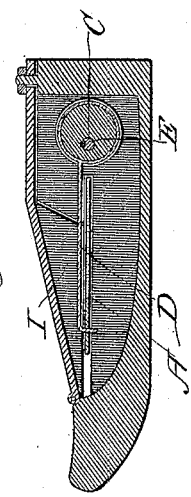
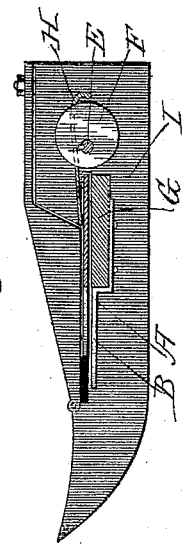
Witnesses,
L. T. Mann
Frederick B. Goodwin
Inventor,
John Burke
By Offield & Towle
Att'ys

UNITED STATES PATENT OFFICE.

JOHN BURKE, OF DE KALB, ILLINOIS, ASSIGNOR OF ONE-HALF TO HIRAM ELLWOOD, OF SAME PLACE.

CUTTING APPARATUS FOR GRAIN CUTTING OR MOWING MACHINES.

SPECIFICATION forming part of Letters Patent No. 324,651, dated August 18, 1885.

Application filed August 1, 1884. (No model.)

*To all whom it may concern:*

Be it known that I, JOHN BURKE, a citizen of the United States, residing at De Kalb, in the county of De Kalb and State of Illinois, have invented a new and useful Improvement in Cutting Apparatus for Grain Cutting or Mowing Machines, of which the following is a full, clear, and exact description, reference being had to the accompanying drawings.

My invention relates to the sickle of a reaping or mowing machine and its connecting and operating mechanism. In the ordinary mowing-machine, the sickle as now used, moves or plays laterally from side to side, and cuts the grain by a sidewise motion.

My invention principally consists in mowing or playing the sickle forward and back, and cutting the grass or grain by both edges of the blade or teeth at once, or at the same stroke; and it consists of the ordinary sickle having a forward and back motion.

The object of my invention is to make a more powerful and effective sickle, and to dispense with the sidewise motion or cut, and also in providing protection for the devices operating the sickle itself.

In the drawings, Figure 1 is a perspective view of that part of the machine embodying my invention, the dotted lines showing the position of the sickle when advanced upon the completion of its cutting-stroke. Fig. 2 is a cross-section of my invention through the lines x x. Fig. 3 is a cross-sectional view of the hollow shoe or divider containing the rod and eccentrics operating the sickle-blade. My invention operates with equal effect without the ordinary guards for the sickle-teeth now found in this class of machines, and it is not necessary to have such guards, but simply a guide or rest to support the teeth in their backward and forward play.

Like letters of reference indicate like parts.

A is the sickle. B are the rests or supports for the sickle-teeth. C C are the eccentrics carrying the driving-rods. D D are the driving-rods. E is the shaft carrying the eccentric. F is an eccentric placed upon the shaft and following and supporting the back of the sickle in its play. G is the bar, upon which the sickle rests and plays. H is a cover secured to the sickle, playing with the same and protecting the shaft and rear of the sickle from grass or other obstructions. I is the hollow shoe or divider, in which is placed the eccentrics and drive-rods operating the sickle-blade for protection.

The shaft carrying the eccentrics has a knuckle or universal joint, and is preferably connected and operated from the drive-wheel in any ordinary manner, but not herein shown.

In operation, the sickle-blade is in position shown in the drawings, Fig. 1. The grass or grain is forced or accumulated in the spaces between the teeth of the sickle by the forward motion of the machine. The sickle is then advanced to the point shown by the dotted lines by the desired mechanism, and the grain is then severed by the forward advancing shear-cut of the sickle-teeth. This manner of cutting grain or grass, both sides of the blade cutting at the same time, insures the even falling of the grain and is effective and rapid in its operation.

It can readily be seen that the various parts may be changed in detail without departing from my invention—as, for example, cranks may be substituted for eccentrics in operating the sickle. It may be desirable also to use guards in certain conditions of grass on obstructed ground; but these guards are not necessary in the practical operation of my machine.

Having thus described my invention, what I claim, and desire to secure by Letters Patent, is—

1. In a reaping or mowing machine, a sickle-bar, the blades of the sickle moving over or in connection with supporting-finger rests having a direct forward and back motion and severing the grass or the grain by a direct forward movement, both edges of the sickle teeth or blade cutting and acting upon the grain at the same time, substantially as shown and described.

2. In a reaping or mowing machine, the combination of the sickle-driving shaft and the sickle with hollow shoes or dividers supporting said shaft and sickle and driving mechanism connecting the shaft and sickle and inclosed within said hollow shoes, substantially as described and for the purpose set forth.

3. The combination of the sickle-bar A, eccentrics C C, one at each end of the sickle-bar, drive-rods D D, and shaft E, substantially as shown and described.

4. The combination of the sickle-bar A, eccentrics C C, drive-rods D D, shaft E, and eccentric F, following and supporting the sickle-bar in its play, substantially as shown and described.

5. The combination of the sickle-bar A, eccentrics C C, drive-rods D D, shaft E, and rests B, directly under the sickle-blades, substantially as shown and described.

6. The combination of the sickle-bar A, rests B, eccentrics C C, one at each end of the sickle-bar, drive-rods D D, shaft E, bar G, substantially as shown and described.

7. The combination of the sickle A and cover H, secured to and reciprocating with said sickle, substantially as shown and described.

8. The combination of the hollow shoe or divider I, sickle A, eccentrics C C, drive-rods D D, and shaft E, substantially as shown and described.

JOHN BURKE.

Witnesses:
FREDERICK C. GOODWIN,
C. H. BRUTTON.